(12) United States Patent
Casses et al.

(10) Patent No.: US 8,992,268 B2
(45) Date of Patent: Mar. 31, 2015

(54) ELECTRICAL CONNECTION BUS

(75) Inventors: Claude Casses, Clevilliers (FR); Jean Pierre Jarnoux, Chartres (FR)

(73) Assignee: Delphi International Operations Luxembourg S.A.R.L., Luxembourg (LU)

( * ) Notice: Subject to any disclaimer, the term of this patent is extended or adjusted under 35 U.S.C. 154(b) by 198 days.

(21) Appl. No.: 13/805,387

(22) PCT Filed: Jun. 17, 2011

(86) PCT No.: PCT/EP2011/060154
§ 371 (c)(1),
(2), (4) Date: Feb. 11, 2013

(87) PCT Pub. No.: WO2011/161023
PCT Pub. Date: Dec. 29, 2011

(65) Prior Publication Data
US 2013/0143450 A1    Jun. 6, 2013

(30) Foreign Application Priority Data

Jun. 24, 2010   (WO) .................. PCT/IB2010/001934

(51) Int. Cl.
| | | |
|---|---|---|
| *H01R 4/48* | (2006.01) | |
| *H01R 11/01* | (2006.01) | |
| *H01M 2/20* | (2006.01) | |
| *H01R 11/28* | (2006.01) | |
| *H01R 13/11* | (2006.01) | |

(52) U.S. Cl.
CPC .............. *H01R 11/01* (2013.01); *H01M 2/206* (2013.01); *H01R 11/288* (2013.01); *H01R 13/111* (2013.01)

USPC .......................................... 439/816; 439/627

(58) Field of Classification Search
USPC ......... 439/816, 627, 500, 504, 510, 512, 522, 439/756, 99; 320/112
See application file for complete search history.

(56) References Cited

U.S. PATENT DOCUMENTS

| | | | |
|---|---|---|---|
| 5,378,552 A | 1/1995 | Dixon, Jr. ...................... 429/91 |
| 5,886,501 A | 3/1999 | Marks et al. .................. 320/112 |
| 7,229,327 B2* | 6/2007 | Zhao et al. .................... 439/840 |
| 7,601,028 B2* | 10/2009 | Eckel et al. .................... 439/579 |
| 8,098,126 B2* | 1/2012 | Niedzwiecki et al. ........ 337/205 |
| 2006/0279086 A1 | 12/2006 | Kishibata et al. ............... 290/31 |
| 2008/0261458 A1* | 10/2008 | Eckel et al. .................... 439/709 |
| 2011/0028051 A1* | 2/2011 | Heigl et al. .................... 439/736 |

FOREIGN PATENT DOCUMENTS

WO   WO 2010/029391 A1   3/2010

* cited by examiner

*Primary Examiner* — Hae Moon Hyeon
(74) *Attorney, Agent, or Firm* — Robert J. Myers

(57) ABSTRACT

A connecting bus includes an electrically conductive bar comprising two electrical connector assemblies. At least one of the two electrical connector assemblies includes a female connector having at least one electrically conductive spring tongue. For each of the electrical connection assemblies included in the connecting bus, the electrically conductive bar includes a corresponding non-isolated zone surrounding the electrical connection assembly. The electrically conductive bar further includes an outside electrically insulating layer surrounding the whole electrically conductive bar apart from the non-isolated zone.

9 Claims, 4 Drawing Sheets

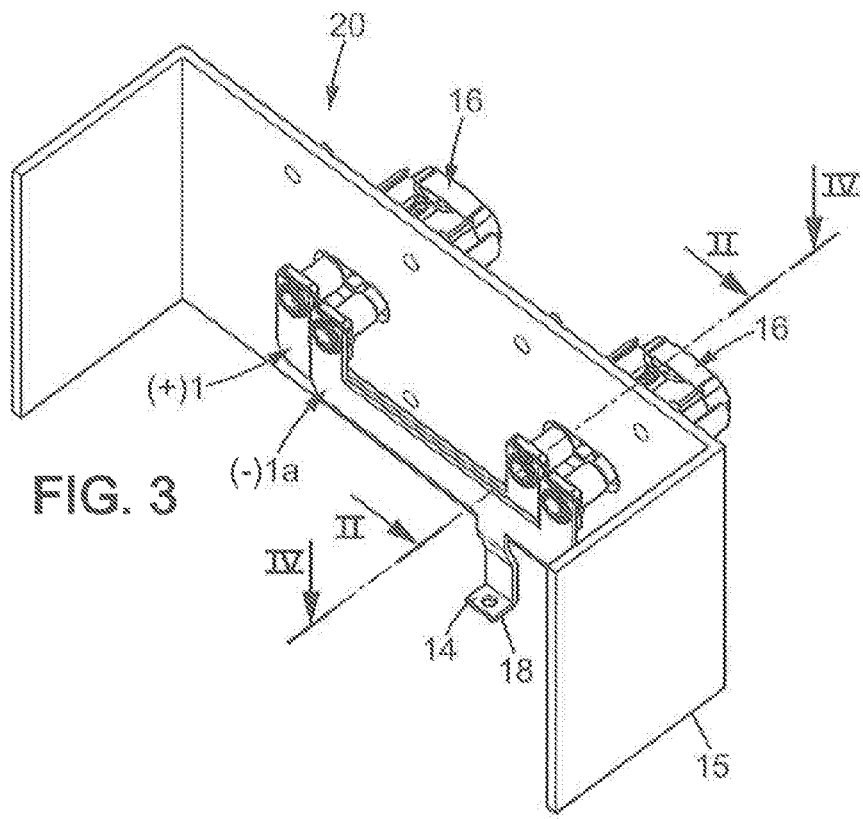
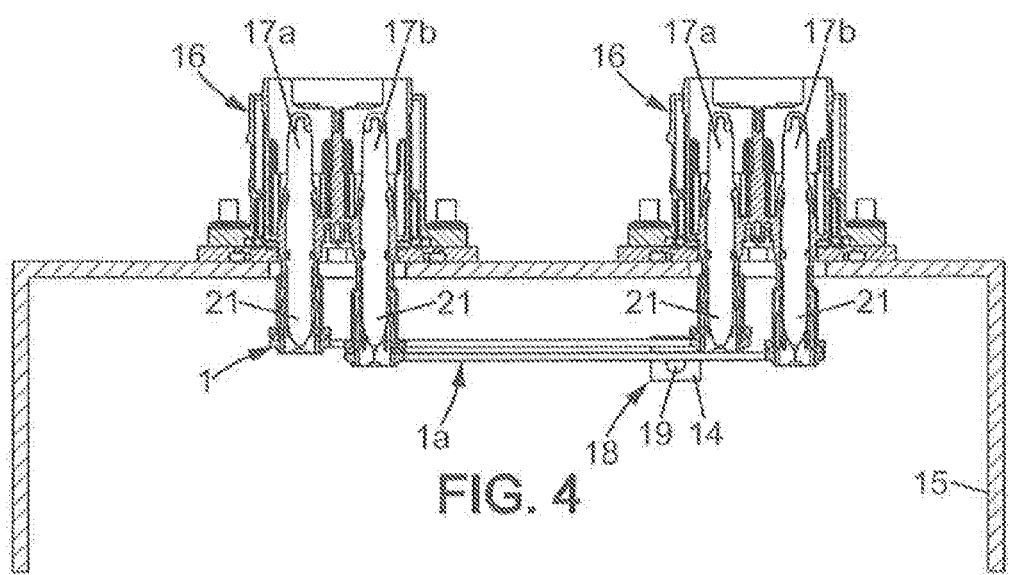

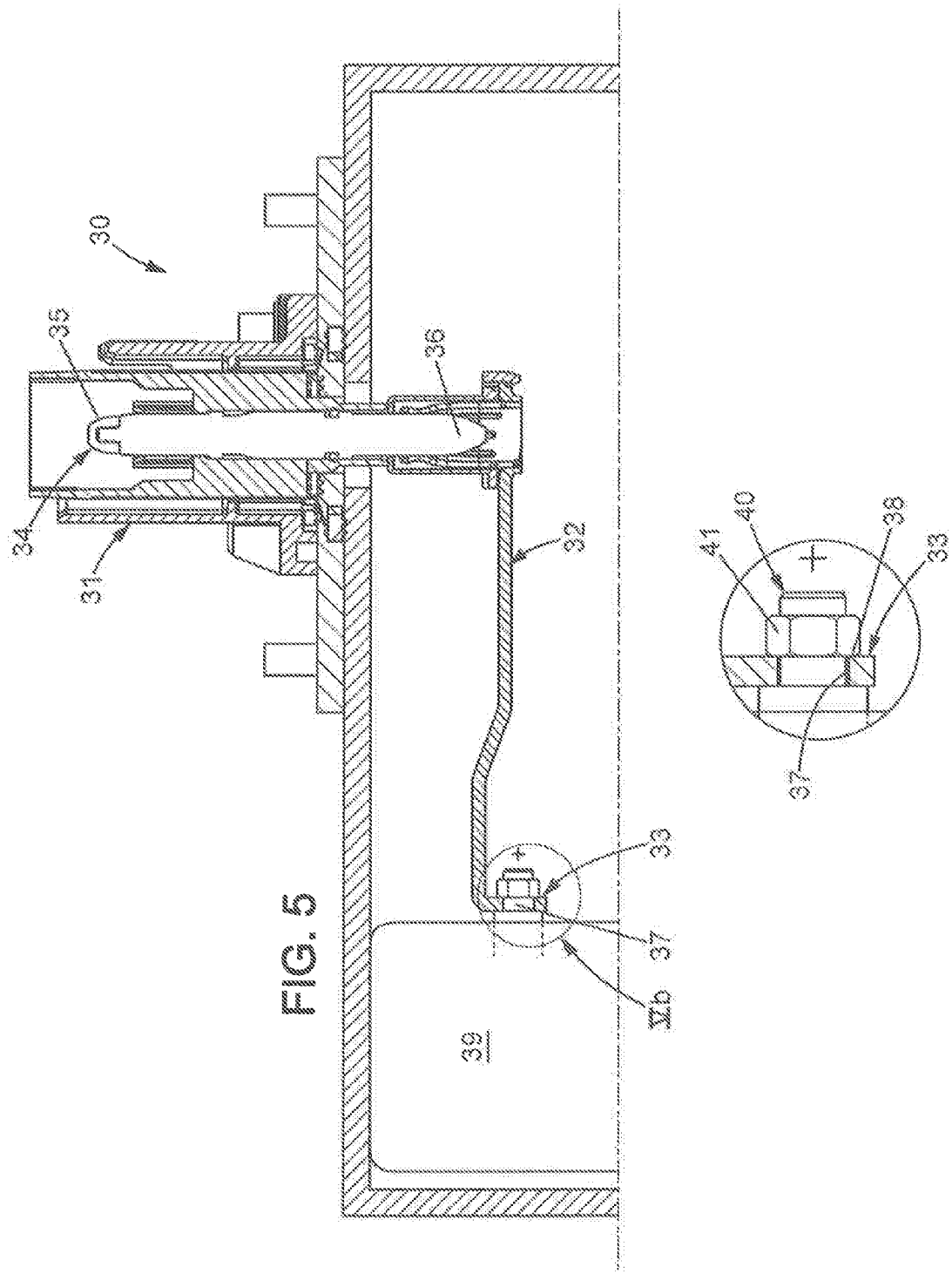

ELECTRICAL CONNECTION BUS

TECHNICAL FIELD OF THE INVENTION

The invention relates to a connecting bus and to a connector assembly including a connecting bus. For example the connecting bus of the present invention can be applied in vehicle electrical power equipment.

BACKGROUND OF THE INVENTION

Traditionally, electrical terminals of adjacent battery modules were electrically connected by a connecting bus having two holes adapted to these terminals. The mechanical and the electrical connection were provided by the pressure of a screw/bolt system. The reliability of the electrical connection was depending on the tightening torque of the screw. In a vehicle, vibration may affect the reliability of the screwed connecting bar.

In recent hybrid vehicles, the amount of electrical power equipment is increasing. The reliability of the electrical power connection comes to be a critical issue.

Traditional vehicle electrical power connectors were used to interconnect electrical devices suitable for high current intensity. Such a device could be a flexible electrical cable of a large cross-section or a rigid connecting bar which provides a similar large cross section. When such a connector was used with a rigid connecting bus, the electrical power contact of the connector was screwed on the connecting bus. This requires a very precise connector implementation on the power equipment. Therefore, there is a need for a vehicle connector assembly transmitting electrical power to a connecting bus which is compatible with the vibration environment of a vehicle and which is simple to implement in power equipment.

The invention provides a connecting bus and a connector assembly including a connecting bus, for vehicle power equipment which remedies to at least one of the above drawbacks.

A goal of the invention is to improve the reliability of the electrical connection provided by a connecting bus and to simplify the implementation into vehicle power equipment.

BRIEF SUMMARY OF THE INVENTION

According to one embodiment, the invention provides a connecting bus for a vehicle electrical power equipment, comprising an electrical conductive bar including two electrical connection means. At least one of the two electrical connection means comprises a female connector including one or several electrically conductive spring tongues.

According to one embodiment, the invention provides a connector assembly for vehicle electrical power equipment, comprising at least one electrical connector for vehicle power equipment, and at least one connecting bus, electrically connected to the connector by an electrical connection means. The electrical connection means comprises a female connector including one or several spring tongues.

The spring tongues of the connection means provide a safer connection than a screw/bolt system because there is no unscrew or drift risk. The electrical connection is prevented from being discontinued and is simple to install.

In some other embodiments, one might also use one or more of the features as defined in dependent claims.

BRIEF DESCRIPTION OF THE SEVERAL VIEWS OF THE DRAWING

Other characteristics and advantages of the invention will readily appear from the following description of some of its embodiments, provided as a non-limitative example, and of the accompanying drawings.

On the drawings:

FIG. 3 is a perspective view of electrical equipment using two connecting bars;

FIG. 4 is a cross-section of the equipment of the FIG. 3 according to plan IV-IV;

FIG. 5 is a cross-section of a second embodiment; and

DETAILED DESCRIPTION OF THE INVENTION

Figure 1:
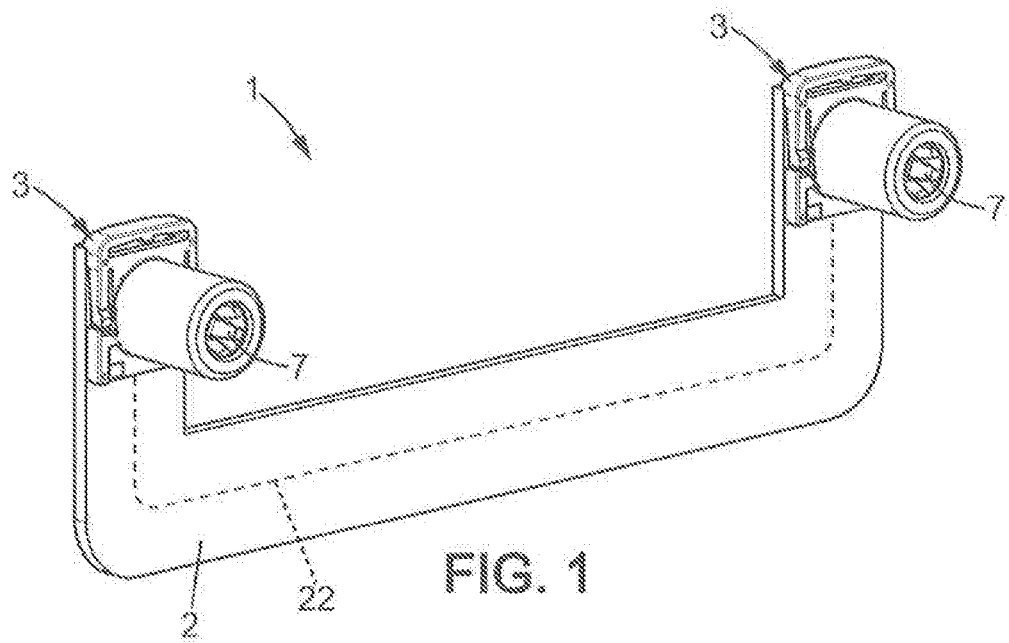
FIG. 1 is a perspective view of a first embodiment.

As illustrated in FIG. 1, the connecting bus 1 comprises an electrically conductive bar 2 and two female connectors 3. The electrically conductive bar 2 is substantially flat and extends along a middle line 22 having a U-shape within a plane of the electrically conductive bar 2. The cross-section of the electrically conductive bar 2, perpendicularly to the middle line 22, is rectangular. The electrically conductive bar 2 has a width, parallel to the bar plan and a thickness perpendicularly to the bar plane. The thickness is bigger than a tenth of the width, so the bar is rather rigid.

Figure 2:
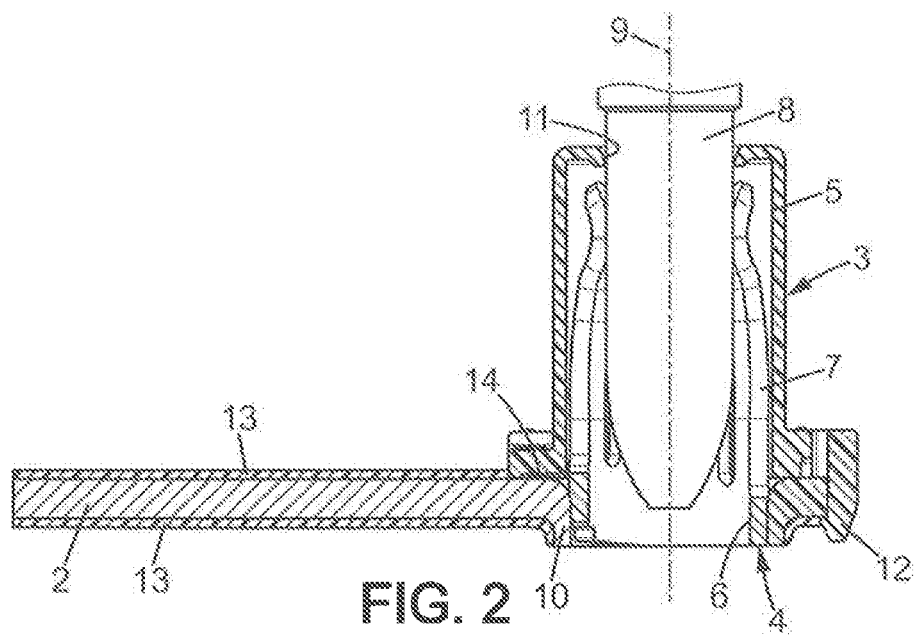
FIG. 2 is a cross-section of the first embodiment to the plan II-II of FIG. 3.

As illustrated in FIG. 2, the female connector 3 comprises a socket 4 and an insulating housing 5 surrounding the socket 4. The socket 4 comprises a rigid tubular part 6 from which a plurality of cantilevered spring tongues 7, separated by gaps or slots, extend. The cantilevered spring tongues 7 taper inwardly towards the interior of the socket 4 so as to define a tubular contact region, and then flare outwardly to provide a guiding end portion. The socket 4 is adapted to receive a pin contact 8 following an insertion axis 9.

The socket 4 can be made of a cut and rolled sheet. The tubular part 6 is press-fitted into annular opening, formed in of the electrically conductive bar 2, and is delimited by annular edges 10. The insulating housing 5 comprises fixation means 12 adapted to be tightly fixed to the electrically conductive bar 2. The fixation means 12 may include a centering shape and/or crimping hooks or the like. The insulating housing 5 comprises a guiding aperture 11, concentric with the insertion axis 9. The diameter of the guiding aperture 11 is such that the major radial impact during the insertion of the pin contact 8 into the female connector 3 is transmitted to the insulating housing 5 and directly to the electrically conductive bar 2 without damaging the soft spring tongues 7.

The connecting bus 1 further comprises an insulating layer 13 covering nearly all the exposed surfaces of the electrically conductive bar 2. Only some unprotected zones 14 are prevented from being covered by the insulating layer 13. The unprotected zones 14 include the inside cylindrical surface of the annular edge 10, so the press-fitting of the tubular part 6 into the unprotected surface provides the electrical connection. Therefore, the electrical connection extends from the pin contact 8 to the spring tongues 7, and then to the electrically conductive bar 2. The insulating layers 13 covers the electrically conductive bar 2 all around each of the female connector 3 and extends from one female connector 3 to the other.

The electrically conductive bar 2 could be made of a solid copper alloy or the like. The insulating layer 13 could be made by an insulating paint or by a polymer sheath or the like.

The cross-section of the pin contact 8 is similar to the sum of the cross-section of each individual spring tongue 7. The cross-section of the electrically conductive bar 2 is similar or larger than the cross-section of the pin contact 8. So, the resistivity of the electrical connection is rather constant from the pin contact 8 to the electrically conductive bar 2. Preferably, the electrically conductive bar 2 has a substantially constant cross-section all along the middle line 22. This avoids hot points due to joule effect.

As illustrated in FIG. 3 or 4, electrical equipment 15, used for example in a vehicle electrical power system, comprises a connector assembly 20 including two electrical power connectors 16. Each of the power connectors 16 comprises two power contacts 17a, 17b. One power contact 17a is connected to the positive pole of a vehicle battery (not illustrated); the other power contact 17b of the power connector 16 is connected to the negative pole of the battery. Each power contact 17a, 17b comprises a back pin 21 similar to the pin contact 8 previously described.

The two positive power contacts 17a of each power connector 16 are electrically interconnected by a first connecting bus 1 as previously described. The two negative power contacts 17b are interconnected by a second connecting bus 1a, similar to the first connecting bus 1, apart from the fact that the global shape is not a "U", but a "Y". Two extremities of the "Y" shape comprise each a female connector 3 and the third extremity of the "Y" shape comprises a traditional electrical connection means 18, made of a simple hole 19 surrounded by an unprotected zone 14.

The electrical connection means 18 further hold the whole connecting bus 1a, and stops the connecting bus 1.

The power contact 17a, 17b are adapted for a vehicle power system. The electrical current passing through these power contacts could be as high as 160A. The voltage between the positive and the negative poles could be 400 V. The two connecting buses 1, 1a may touch each other. The insulating layer 13 is suitable for such voltage isolation.

The electrically conductive bars 2 are substantially flat, with a width between five and ten times the bar thickness. This provides a large cross-section for the electrically conductive bar 2 with a relatively small thickness and a rather rigid connecting bar. The axial insertion tolerance for a safe connection between the back pin 21 and the female connector 3 is much larger than the thickness of the electrically conductive bar 2 plus the insulating layer 13. The first connecting bus 1 is pushed on the back pin 21, up to an abutting position. The second connecting bus 1a is pushed up into abutment with the first connecting bus 1.

As illustrated in FIG. 5, a connector assembly 30 comprises an electrical power connector 31, similar to the power connector 16 previously described and a connecting bus 32 which include one female connector 3 as described in FIG. 2 and traditional connection means 33.

The electrical power connector 31 comprises a power contact 34 which includes a front pin 35, adapted to electrically mate with a power socket of a connector (not illustrated) complementary to the connector 31. The power contact further includes a back pin 36. Both front pin 35 and back pin 36 have an extremity with an ogive shape, suitable for repeated mating with the complementary connector or with the female connector 3. The back pin 36 may have a cross section larger than 35 square millimeters (mm$^2$). Any smooth longitudinal profile can be used, like a hemispheric profile.

The traditional connection means 33 may consist in a simple hole 37, surrounded by a non-isolated zone 38. Electrical power equipment 39 comprises an electrical terminal 40 against which the hole 37 is screwed by a screw 41.

The hole 37 and the non-isolated zone 38 provide an electrical connection as well as a mechanical fixation onto the electrical terminal 40. As the connecting bus 32 is rather rigid, the whole connecting bus 32 is held. Therefore, the position of the female connector 3 is determined by the mechanical fixation with respect to the terminal 40.

The traditional connecting bars comprise two holes at each extremity. When these traditional connecting bars had to connect a connector to an internal terminal, the dimensional tolerance requested between the connector and the electrical terminal had to be tightly controlled. Due to the spring tongue 7 of the present connector, the dimensional tolerance between the connector 31 and the electrical terminal 40 is less critical in particular in the axial direction of the back pin 36.

In a variant, the connector assembly 20 or 30 may have a connecting bus comprising a connecting pin and the corresponding power contact 17a, 17b or 34 may have a female connector.

In another variant, the connecting bus 1 or 1a, may comprise three or more female connectors 3. Such a variant could be used to connect battery equipment 50 to several electrical engines as in some hybrid vehicles.

Figure 6:
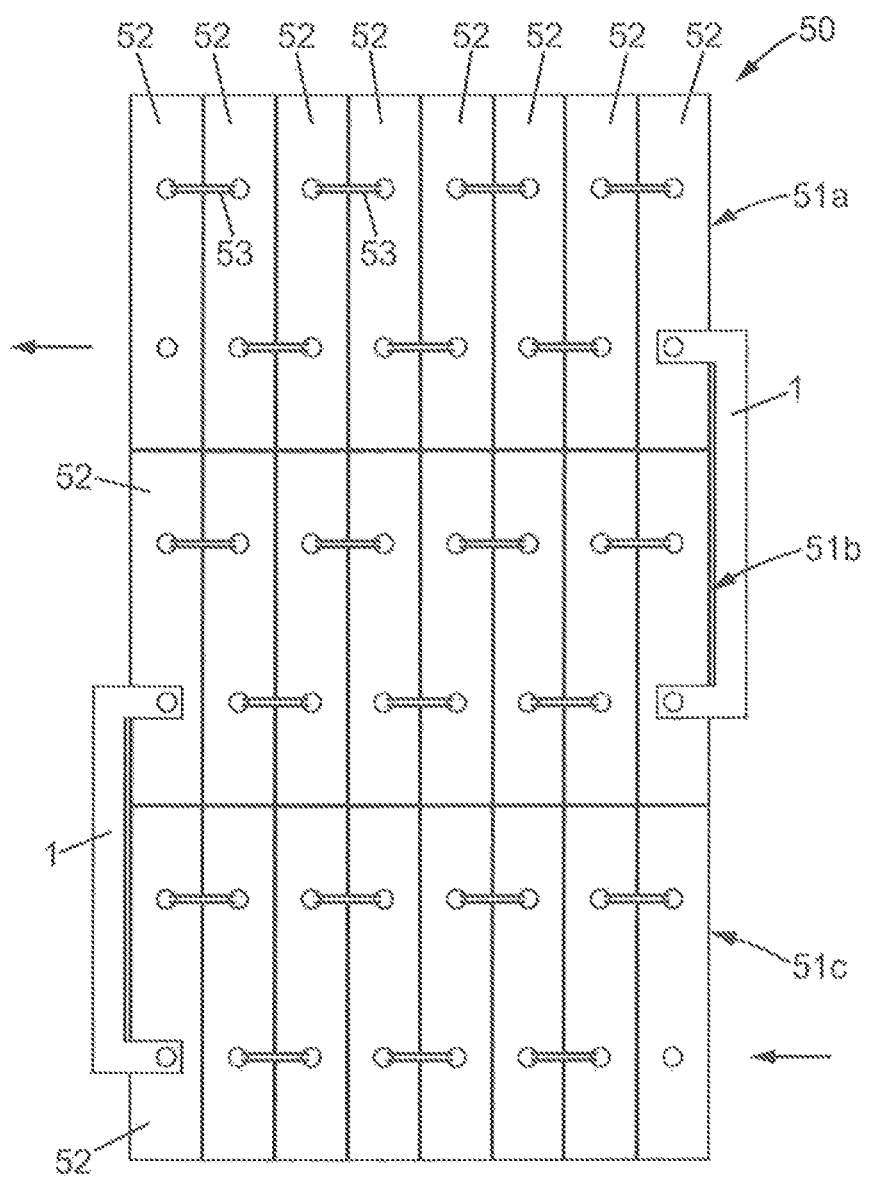
FIG. 6 illustrates a battery.

As illustrated in FIG. 6, a battery 50 comprises three stacks 51a, 51b, and 51c of eight battery modules 52. Each adjacent module 52 of the same stack is electrically connected by a shunt 53 having a U shape. Two adjacent stacks 51a-51b, or 51b-51c are electrically connected by a connecting bus 1 as previously described in FIG. 1. The shunts 53 could also be provided as such buses. In such case, the shunts 53 could be all fixed to a common cover, for example of elastomeric material, so as to provide some play along the X and Y directions, to enable easy connection of a large number of battery modules.

The invention claimed is:

1. A connecting bus, comprising
an electrically conductive bar; and
two electrical connection means electrically connected to one another through said electrically conductive bar, wherein at least one of the two electrical connection means comprises a female connector including an electrically conductive spring tongue, wherein, for each of the electrical connection means included in the connecting bus, the electrically conductive bar includes a corresponding non-isolated zone surrounding said electrical connection means and wherein the electrically conductive bar further comprising an outside electrically insulating layer surrounding the whole electrically conductive bar apart from said non-isolated zone.

2. The connecting bus according to claim 1, wherein the electrically conductive bar is made of a solid copper alloy.

3. The connecting bus according to claim 1, wherein the electrically conductive bar has an elongated shape about a middle line.

4. The connecting bus according to claim 3, wherein the middle line extends in a middle plan, the cross section of the electrically conductive bar with respect to the middle line being substantially rectangular, the larger dimension of the cross section being parallel to the middle plan.

5. The connecting bus according to claim 3, wherein the middle line has a U or a Y shape.

6. The connecting bus according to claim 3, wherein the cross section of the electrically conductive bar is substantially constant along the portion of the middle line extending between the two connection means.

7. The connecting bus according to claim 1, wherein the female connector comprises a cylindrical socket press-fitted in the electrical conductive bar.

8. The connecting bus according to claim 1, wherein the female connector comprises an insulating housing including a guiding aperture adapted to protect the spring tongues during a connection operation of the female connector to a pin contact.

9. The connecting bus according to claim 1, wherein the two electrical connection means are identical.

* * * * *